FLEXIBLE PLASTIC TUBING

Filed Oct. 19, 1960 2 Sheets-Sheet 1

INVENTORS
PHILIP S. BRITTON AND
HELMUT P. FOCHLER
BY
Teare & Fetzer
ATTORNEYS

FLEXIBLE PLASTIC TUBING

Filed Oct. 19, 1960 2 Sheets-Sheet 2

INVENTORS
PHILIP S. BRITTON AND
HELMUT P. FOCHLER
BY
Teare & Fetzer
ATTORNEYS

United States Patent Office 3,122,171
Patented Feb. 25, 1964

3,122,171

FLEXIBLE PLASTIC TUBING

Philip S. Britton, Shaker Heights, and Helmut P. Foehler, Bedford, Ohio, assignors to Carlon Products Corporation, Aurora, Ohio, a corporation of Ohio Filed Oct. 19, 1960, Ser. No. 63,595
2 Claims. (Cl. 138—129)

This invention relates in general to plastic tubing and more particularly to high strength, relatively thin walled plastic tubing.

Plastic tubing is useful for conveying fluids or liquids from one place to another under a great variety of environmental situations. One of such situations is where the tubing is used to convey water from an irrigation ditch to adjacent fields for irrigating the fields. Such tubing heretofore was generally either in the form of a more or less rigid pipe type, or of a flexible pipe type, with any such flexibility of the tubing being generally provided strictly by the elasticity of the material used in forming the tubing. The more or less rigid pipe type, while of generally good strength, including good crush resistance, could not, of course, be oriented after the manufacture thereof to conform to angles and bends about which the tubing passed, and therefore did not always find adequate support for the tubing, unless the tubing was preformed during its manufacture into a particular configuration, the latter limiting its use. The flexible pipe type generally possessed this ability to conform to the contour of supporting surfaces, but it generally did not possess sufficient strength, and especially sufficient crush resistance, due to the elasticity of the material necessary to provide the desired flexibility of the pipe. Moreover, when fluid, such as water, was flowing through the pipe, the ability of the elastic flexible pipe to retain its originally oriented curved or angled configuration diminished, with the pressurized fluid tending to straighten the pipe out and change its positional relation.

The present invention provides a novel, generally thin walled tubing or pipe which may possess considerable flexibility, which can be provided in a large range of diameter sizes, which possesses high strength, and especially very good crush-resistant strength, and which has the ability, if possessing flexible characteristics, to generally retain any originally oriented curved or angled configuration while fluid is flowing through the pipe.

Accordingly, an object of the invention is to provide an improved, relatively thin walled, high crush resistant strength plastic tubing product.

Another object of the invention is to provide a plastic pipe of the above type which may possess considerable flexibility characteristics.

A further object of the invention is to provide a flexible tubing product of the latter type which may generally retain any originally oriented curved or angled configuration during flow of fluid therethrough.

A still further object of the invention is to provide a flexible tubing product of the above type, formed from a strip of plastic material, such as polyethylene or polystyrene in substantially non-elastic form, and wherein the strip of material embodies a ridge disposed intermediate the lateral boundaries of the strip, and with such strip being wound and secured in spiral overlapping relation with adjacent convolutions of the wound strip material, to form the finalized tubing product.

Other objects and advantages of the invention will be apparent from the following description taken in conjunction with the accompanying drawings wherein.

Referring now again to the drawings, and in particular to FIGS. 1 to 4 thereof, there is illustrated a piece of flexible type tubing provided in accordance with the instant invention. The tubing is formed from strip-like material S (FIGS. 2 and 3) spirally wound in overlapped relation with adjacent convolutions of the spirally wound strip, and heat bonded into a finalized tubing product. As can be best seen in FIGS. 2 and 3, the strip-like material S comprises a preferably exterior ridge or rib portion 10 disposed intermediate laterally disposed flange portions 12 and 14.

The strip-like material is preferably formed of a thermo-plastic, such as for instance, polyethylene or rubber modified styrene, having more or less non-elastic properties. The polyethylene may range from a low density type to a high density type, and the plastic material may also be formed of a mixture of polyethylene and other polymeric materials, such as polyisobutylene. Plasticized polyvinyl chloride may also be utilized.

The thickened rib portion 10 provides for considerable strengthening of the finalized tubing product, since as can be seen from FIGS. 1 to 4, such substantially rigid rib portion extends radially a substantial amount in spirally wound or helically extending relation about the exterior of the tubing, thereby providing considerable crush resistant strength to the finalized tubing product.

Figure 1:
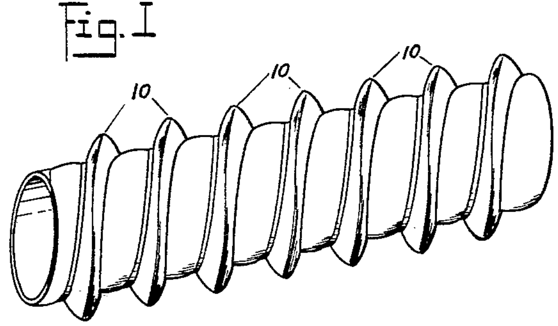
FIG. 1 is a generally perspective view of a plastic tubing product constructed in accordance with the instant invention.
Figure 2:
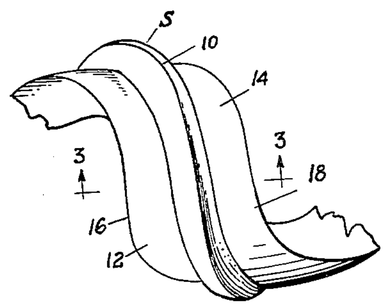
FIG. 2 is an enlarged, fragmentary view of a strip of plastic material used to form the spirally wound, finalized tubing product of FIG. 1.
Figure 3:
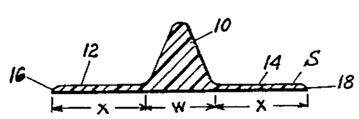
FIG. 3 is an enlarged, sectional view, taken substantially along the plane of line 3—3 of FIG. 2, looking in the direction of the arrows, and showing positional and general size relationships of the ridge portion of the strip material with respect to the lateral flange portions thereof.
Figure 4:
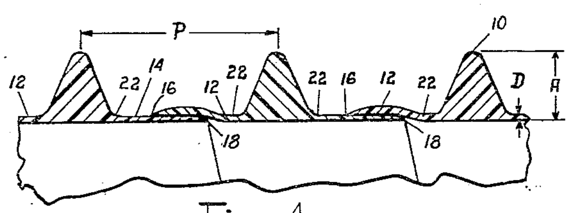
FIG. 4 is a fragmentary sectional view of one form of the generally flexible, plastic tubing product of the instant invention utilizing the strip material of FIGS. 2 and 3.

Referring now in particular to FIG. 4, in accordance with the invention, in order to provide generally flexible characteristics to the finalized tubing product, the strip S of generally non-elastic material is spirally wound and secured in overlapping relation with the adjacent convolutions of the strip, so that the outer boundary edges 16 and 18 of flanges 12 and 14 respectively of one convolution are disposed in longitudinally spaced (or axially spaced with regard to the finalized tubing product) relation to the respective rib portion 10 of the adjacent convolutions of the tubing, and so on along the tubing for the full length thereof.

It will be seen therefore that with such an arrangement, a thicker dimension of the wall of the tubing through a portion of the longitudinal dimension between adjacent rib portions of the tubing is provided, together with relatively thinner wall portions of the tubing. Thus when the tubing is bent to conform the same to a curved or angular contour, the relatively thin wall sections 22 of the flange portions 12 and 14 on the underside (FIGS.

Figure 7:
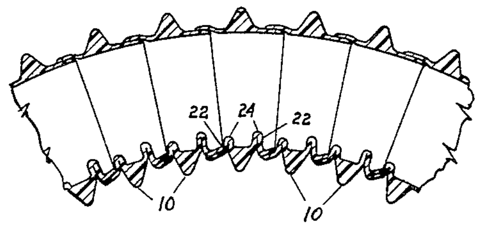
FIG. 7 is a fragmentary sectional view illustrating the creasing of the flange portions in the bent tubing of FIG. 6.

6 and 7), or minimum radius bend of the tubing, fold or crease inwardly as shown at 24 in FIG. 7, to provide considerable flexibility characteristics to the high strength tubing.

Referring now again to FIG. 4, it has been determined that the pitch distance P, or in other words the distance between the centers of adjacent rib portions of the convolutions of the tubing, should be at least 1.7 times the width distance X of one of the flanges of the tubing and preferably in the range of 1.7 to 2 times the distance X, in order to provide the flexibility and high strength characteristics to the tubing. In this connection, the width X of each of the flange portions 12 or 14 of the strip material is in the general range of 1.3 to 2 times the maximum width W (FIG. 3) of the rib portion 10 of the strip. When such pitch distance P is less than the aforementioned 1.7 times the width distance X, the tubing has very little if any flexible characteristics, and may be classified as more or less of an inflexible high strength type tubing. Thus it will be understood that providing the tubing product with predetermined size or extent of relatively thinner wall sections between the helically extending rib portions 10 provides a product of high strength characteristics, but one which has flexibility, whereby the tubing can be bent or deformed into an arcuate contour, for ready use of the tubing around curved support surfaces.

Referring again to FIG. 4, the thickness D of the flange portions 12 and 14 will effect the flexibility of the tubing since if D is increased the flexibility will tend to decrease, but for the relatively thin walled tubing with which the present invention is concerned, such tubing having an internal diameter of at least thirty times the dimension D, any variance of D within the range of relevancy specified between the internal diameter of the tubing product and the dimension D will have relatively little effect on flexibility.

The following list is given for the aforementioned dimensions P, X, W, and D for various internal diameter sizes of tubing product produced in accordance with the invention. These sizes of tubing are adapted for use as siphon tubes in the aforementioned irrigation environment. There is also listed a dimension A (FIG. 4) which indicates the preferred height of the rib portion 10 of the strip material for the tubing sizes listed. It will be noted that the various sizes of tubing are grouped in two columns, with the left hand column designating tubing having flexible characteristics, or in other words wherein the distance P equals at least 1.7 times the distance X, and with the right hand column designating tubing having non-flexible characteristics, or in other words wherein the distance P is less than the aforementioned 1.7 times the distance X.

| Flexible | | Non-Flexible | |
|---|---|---|---|
| | *Inches* | | *Inches* |
| 1″ tubes | P .735<br>X .383<br>W .235<br>D .030<br>A .312 | 1″ tubes | P .485 to .610<br>X .383<br>W .235<br>D .030<br>A .312 |
| 1½″ tubes | P .700<br>X .275<br>W .200<br>D .030<br>A .210 | 1½″ tubes | P .450<br>X .275<br>W .200<br>D .030<br>A .210 |
| 1½″ tubes | P .715<br>X .393<br>W .215<br>D .025<br>A .275 | 1½″ tubes | P.465 to .590<br>X .393<br>W .215<br>D .025<br>A .275 |
| 2″ tubes | P 1.010<br>X .495<br>W .260<br>D .025<br>A .200 | 2″ tubes | P .635<br>X .495<br>W .260<br>D .025<br>A .200 |

It will be understood that the above are illustrative only and so long as the minimum ranges of aforedescribed relationships are maintained, a novel tubing product will be produced in accordance with the instant invention.

Figure 8:
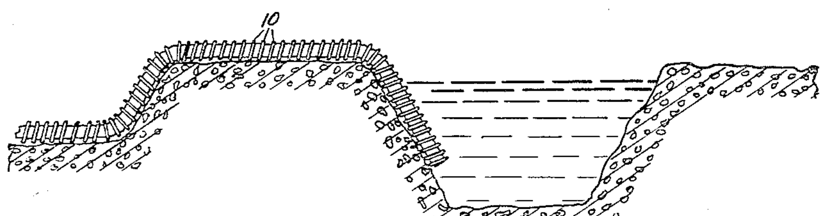
FIG. 8 is a diagrammatic illustration of an environmental use of the flexible type tubing of the invention, showing the tubing being utilized to convey water from an irrigation ditch to adjacent cultivated ground, for irrigation purposes.

Referring now to FIG. 8, it will be seen that the flexible type tubing is ideally suited for conforming to the contour of a supporting surface, such as the banks of the irrigation ditch illustrated, and readily adapts itself to many environmental uses where it is desirable to have a relatively thin walled high strength plastic tubing for carrying fluid, and where it is desirable to conform the tubing to a supporting surface, and assuring retention of the tubing in whatever position placed.

Figure 5:
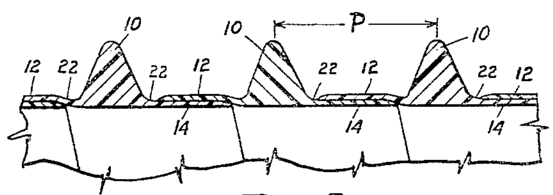
FIG. 5 is a view generally similar to that of FIG. 4, but illustrating a modified form of the tubing, which modified form is of a generally non-flexible type.
Figure 6:
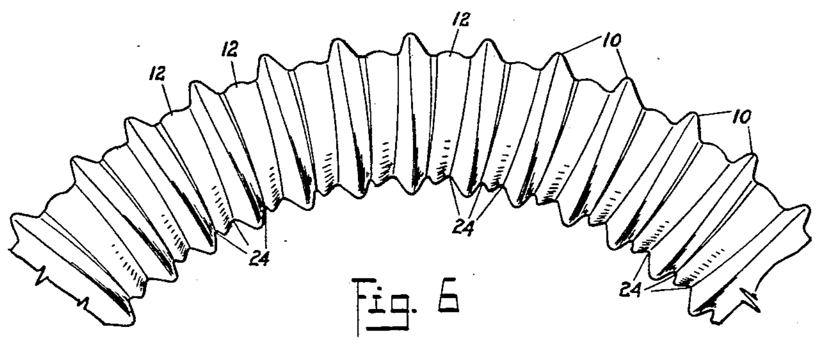
FIG. 6 is a fragmentary, elevational view of a piece of the flexible type tubing of the invention, as oriented in a curved configuration, and illustrating the flexure or creasing of sections of the flange portions of the wound strip material forming the tubing.

Referring now to FIG. 5, there is shown a modified form of the invention in which the spirally wound convolutions of the strip-like material forming the tubing product are wound closer together as compared with that of FIG. 4, whereby the end boundaries of flanges 12 and 14 on the convolutions are disposed closer to the adjacent ridge or rib portion of the adjacent convolution. It will be seen that such an arrangement decreases the longitudinal or axial dimensions of the thinner wall sections 22 of the tubing, and leaves a lesser amount of such thinner wall portions for inward folding or creasing upon bending of the tubing. Thus such a tubing product has very little if any flexibility since such reduced size or extent of thinner wall sections are not sufficient to provide for any creasing of the tubing product in the manner aforedescribed. In this connection the pitch distance P between adjacent rib portions 10 of the tubing is less than the aforementioned 1.7 times the width distance X of the flange portions of the strip material of the tubing, and as aforementioned and as indicated in the right hand column of the above exemplary list, results in a substantially non-flexible tubing product. However, such tubing product has great strength characteristics and especially very good crush resistance.

From the foregoing discussion and accompanying drawings it will be seen that the invention provides an improved plastic tubing product for use in a variety of environmental settings, with such tubing product being formed from relatively inexpensive thermoplastic material, and which may still possess considerable flexible characteristics including the ability to retain a curved or angled orientation thereof even though liquid is flowing through the tubing, and by so arranging the pitch distance between adjacent rib portions of the tubing, the flexibility characteristics of the tubing can be varied. Moreover, it will be seen that the invention provides a high strength flexible tubing product formed of generally nonelastic plastic material and including wall structure comprising generally helically extending rib or ridge portions with flanged portions disposed intermediate the rib portions to define the wall structure of the tubing, and with such flange portions having generally spirally extending sections of lesser thickness than the remainder of the respective flange portion.

The terms and expressions which have been used are used as terms of description and not of limitation, and there is no intention in the use of such terms and expressions of excluding any equivalents of the invention shown or described, or portions thereof, but it is recognized that various modifications are possible within the scope of the invention claimed.

We claim:

1. A relatively thin walled, high strength flexible tubing comprised of relatively non-elastic plastic material and being formed from a spirally wound strip of said material, said strip having laterally disposed relatively thin flanges and an intermediate continuous central exterior rib of substantial radial dimension and wherein said rib extends spirally around the exterior of said tubing, and with said flanges in any one convolution of said strip being secured in lapped relation with the flanges of the adjacent convolutions of the spirally wound strip of material to form thickened intermediate wall portions disposed between the rib portions and defining with said rib portions the enclosing wall structure of the tubing, the width of each of the flanges of the strip material being in the general range of 1.3 to 2 times the maximum width of said rib of the strip of material, the outer edges of each of said flanges being disposed in axial spaced relation to the rib portion of the adjacent convolution, to such extent that the distance between the centers of adjacent rib portions of adjacent convolutions of the tubing is in the range of 1.7 to 2 times the width of one of said flanges, thereby providing each intermediate wall portion with a plurality of helically extending sections of a lesser wall thickness than the wall thickness of the remainder of the respective intermediate wall portion, said lesser wall thickness sections being of sufficient dimension in a direction axially of the tubing to adapt said lesser wall thickness sections to be folded inwardly upon bending of said tubing to provide for flexure of the latter.

2. A flexible tubing in accordance with claim 1, wherein said laterally disposed flanges are of generally flat configuration and are disposed in generally coplanar relation.

References Cited in the file of this patent

UNITED STATES PATENTS

| | | |
|---|---|---|
| 1,977,775 | Patterson | Oct. 23, 1934 |
| 2,396,059 | Roberts | Mar. 5, 1946 |
| 2,730,762 | Ballard | Jan. 17, 1956 |
| 2,731,070 | Meissner | Jan. 17, 1956 |
| 2,884,957 | Harris | May 5, 1959 |
| 2,994,104 | Mittag | Aug. 1, 1961 |

FOREIGN PATENTS

| | | |
|---|---|---|
| 641,090 | Great Britain | Aug. 2, 1950 |
| 751,621 | Germany | May 18, 1953 |
| 775,639 | Great Britain | May 29, 1957 |
| 789,521 | Great Britain | Jan. 22, 1958 |